United States Patent
Shin et al.

(10) Patent No.: US 9,971,209 B2
(45) Date of Patent: May 15, 2018

(54) LIQUID CRYSTAL DISPLAY

(71) Applicant: SAMSUNG DISPLAY CO., LTD., Yongin-si, Gyeonggi-do (KR)

(72) Inventors: Cheol Shin, Hwaseong-si (KR); Hak Sun Chang, Yongin-si (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 111 days.

(21) Appl. No.: 15/074,310

(22) Filed: Mar. 18, 2016

(65) Prior Publication Data
US 2016/0320678 A1 Nov. 3, 2016

(30) Foreign Application Priority Data
Apr. 30, 2015 (KR) .................. 10-2015-0061603

(51) Int. Cl.
*G02F 1/1343* (2006.01)
*G02F 1/1362* (2006.01)

(52) U.S. Cl.
CPC ............. *G02F 1/134309* (2013.01); *G02F 2001/134345* (2013.01)

(58) Field of Classification Search
CPC ......... G02F 1/134309; G02F 1/133707; G02F 2001/134318
See application file for complete search history.

(56) References Cited

U.S. PATENT DOCUMENTS

| 8,804,085 B2* | 8/2014 | Lim | G02F 1/13624 349/123 |
| 2012/0200818 A1* | 8/2012 | Lee | G02F 1/136286 349/143 |
| 2014/0211103 A1* | 7/2014 | Baek | G02F 1/133753 349/12 |
| 2015/0009442 A1* | 1/2015 | Lee | G02F 1/134336 349/43 |
| 2015/0029449 A1* | 1/2015 | Woo | G02F 1/133512 349/110 |
| 2015/0226998 A1* | 8/2015 | Bang | G02F 1/133377 349/43 |
| 2015/0378193 A1* | 12/2015 | Song | G02F 1/133528 349/96 |

FOREIGN PATENT DOCUMENTS

| KR | 1020110065742 A | 6/2011 |
| KR | 1020140021105 A | 2/2014 |

* cited by examiner

*Primary Examiner* — Mariceli Santiago
(74) *Attorney, Agent, or Firm* — Cantor Colburn LLP

(57) ABSTRACT

A liquid crystal display includes a first substrate, a gate line the first substrate, an insulating layer the gate line, and pixel electrodes the insulating layer, where the pixel electrodes include a first pixel electrode, a second pixel electrode, and a third pixel electrode neighboring to each other, each of the first pixel electrode, the second pixel electrode, and the third pixel electrode includes a vertical stem part, a horizontal stem part, and fine branch parts extended from each horizontal stem part and each vertical stem part to both opposite sides in a diagonal direction, the fine branch parts of the first pixel electrode are alternately branched to the both opposite sides of the horizontal stem part and the vertical stem part, and the second pixel electrode and the third pixel electrode include an outer side part enclosing an edge of each pixel electrode.

16 Claims, 15 Drawing Sheets

FIG. 10A
FIG. 10B
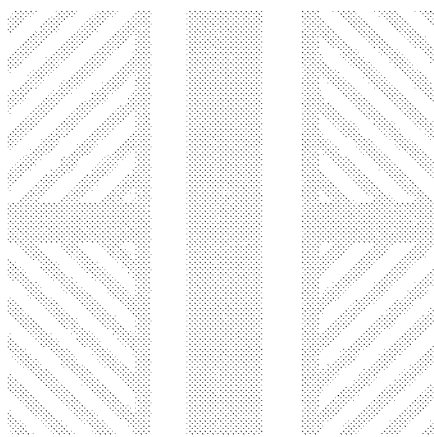
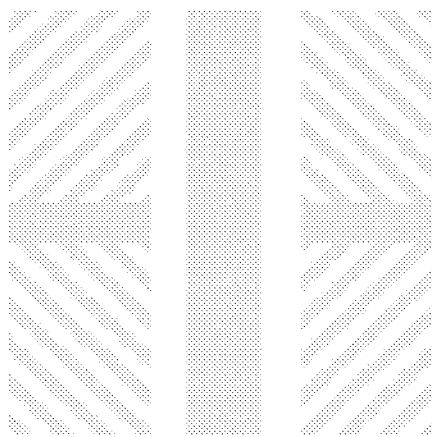
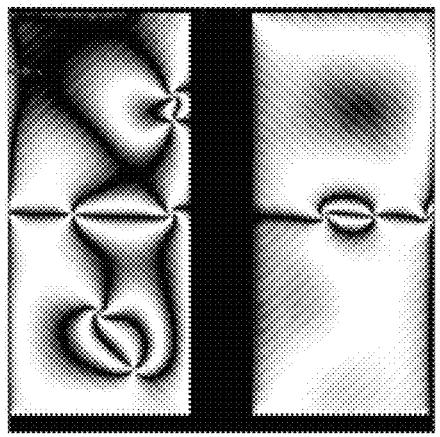
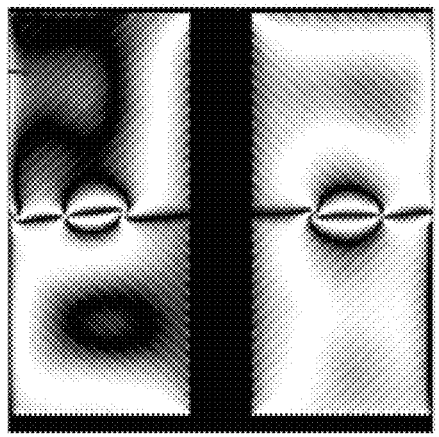

LIQUID CRYSTAL DISPLAY

This application claims priority to Korean Patent Application No. 10-2015-0061603 filed on Apr. 30, 2015, and all the benefits accruing therefrom under 35 U.S.C. § 119, the content of which in its entirety is incorporated herein by reference.

BACKGROUND (a) Field

Exemplary embodiment of the invention relates to a liquid crystal display.

(b) Description of the Related Art

A liquid crystal display ("LCD"), which is one of flat panel displays that are currently used widely, includes two display panels on which field generating electrodes such as pixel electrodes, common electrodes, and the like, are formed, and a liquid crystal layer interposed between the two display panels. The LCD applies a voltage to the field generating electrodes to generate an electric field in the liquid crystal layer, thereby determining a direction of liquid crystal molecules of the liquid crystal layer and controlling polarization of incident light to display an image.

Among the LCDs, a vertically aligned ("VA") mode LCD in which long sides of the liquid crystal molecules are arranged to be vertical to upper and lower display panels in a state in which the electric field is not applied has been prominent since it has a large contrast ratio and may easily implement a wide reference viewing angle.

In order to implement a wide viewing angle in the VA mode LCD, a plurality of domains in which alignment directions of liquid crystals are different from each other may be formed in one pixel.

As a means for forming the plurality of domains as described above, a method such as a method of forming a cutout such as a fine slit, or the like, in the field generating electrode, a method of forming a protrusion on the field generating electrode, or the like, is used. In this method, liquid crystals are aligned in a direction in which they are vertical to a fringe field formed between an edge of the cutout or the protrusion and the field generating electrode facing the edge of the cutout or the protrusion by the fringe field, thereby making it possible to form the plurality of domains.

In addition, a curved display has been recently prominent for the purpose of improvement of an immersion sense, or the like, and it has become important to maintain a color sense, image quality, and the like, at the same level as those of a flat display at the time of implementing the curved display.

SUMMARY

The invention has been made in an effort to provide a liquid crystal display ("LCD") having advantages of preventing generation of a color sense decrease at the time of being curved.

An exemplary embodiment of the invention provides an LCD including a first substrate, a gate line disposed on the first substrate, an insulating layer disposed on the gate line, and a plurality of pixel electrodes disposed on the insulating layer, where the plurality of pixel electrodes include a first pixel electrode, a second pixel electrode, and a third pixel electrode neighboring to each other, each of the first pixel electrode, the second pixel electrode, and the third pixel electrode includes a vertical stem part, a horizontal stem part intersecting with the vertical stem part, and fine branch parts extended from each horizontal stem part and each vertical stem part to both opposite sides in a diagonal direction, the fine branch parts of the first pixel electrode are alternately branched to both opposite sides of the horizontal stem part and the vertical stem part, and the second pixel electrode and the third pixel electrode include an outer side part enclosing an edge of each pixel electrode.

In an exemplary embodiment, the LCD may further include color filters each provided in regions corresponding to the first pixel electrode, the second pixel electrode, and the third pixel electrode, where a red color filter is provided in a region corresponding to the first pixel electrode.

In an exemplary embodiment, a green color filter may be provided in a region corresponding to the second pixel electrode, and a blue color filter may be provided in a region corresponding to the third pixel electrode.

In an exemplary embodiment, the fine branch parts of the second pixel electrode and the third pixel electrode may be branched to both opposite sides of the horizontal stem part and the vertical stem part so as to be symmetrical to each other.

In an exemplary embodiment, the first pixel electrode may include an upper end stem part and a lower end stem part positioned at both ends of the vertical stem part and orthogonal to the vertical stem part.

In an exemplary embodiment, the LCD may be a curved LCD curved in a horizontal direction.

In an exemplary embodiment, each of the first pixel electrode, the second pixel electrode, and the third pixel electrode may include a first sub-pixel electrode and a second sub-pixel electrode.

In an exemplary embodiment, the first sub-pixel electrode and the second sub-pixel electrode may be positioned with the gate line interposed therebetween, and the second sub-pixel electrode may have a size larger than that of the first sub-pixel electrode.

In an exemplary embodiment, each of the first sub-pixel electrode and the second sub-pixel electrode of the first pixel electrode may include a vertical stem part, a horizontal stem part intersecting with the vertical stem part, and fine branch parts extended from each horizontal stem part and each vertical stem part to both opposite sides in the diagonal direction, and the fine branch parts of the first sub-pixel electrode and the second sub-pixel electrode may be alternately branched to both opposite sides of the horizontal stem part and the vertical stem part.

In an exemplary embodiment, each of the first sub-pixel electrode and the second sub-pixel electrode of the second pixel electrode may include a vertical stem part, a horizontal stem part intersecting with the vertical stem part, and fine branch parts extended from each horizontal stem part and each vertical stem part to both opposite sides in the diagonal direction, and each of the first sub-pixel electrode and the second sub-pixel electrode may include an outer side part enclosing an edge thereof.

In an exemplary embodiment, each of the first sub-pixel electrode and the second sub-pixel electrode of the third pixel electrode may include a vertical stem part, a horizontal stem part intersecting with the vertical stem part, and fine branch parts extended from each horizontal stem part and each vertical stem part to both opposite sides in the diagonal direction, and each of the first sub-pixel electrode and the second sub-pixel electrode may include an outer side part enclosing an edge thereof.

In an exemplary embodiment, the fine branch parts of the second pixel electrode and the third pixel electrode may be branched to both opposite sides of the horizontal stem part and the vertical stem part so as to be symmetrical to each other.

In an exemplary embodiment, the LCD may further include color filters each provided in regions corresponding to the first pixel electrode, the second pixel electrode, and the third pixel electrode, where a red color filter is provided in a region corresponding to the first pixel electrode, a green color filter is provided in a region corresponding to the second pixel electrode, and a blue color filter is provided in a region corresponding to the third pixel electrode.

In an exemplary embodiment, the LCD may further include a second substrate, and a liquid crystal layer interposed between the first substrate and the second substrate.

In an exemplary embodiment, different voltages may be applied to the first sub-pixel electrode and the second sub-pixel electrode, and a voltage supplied to the first sub-pixel electrode may be larger than a voltage supplied to the second sub-pixel electrode.

In an exemplary embodiment, the LCD may be a curved LCD curved in a horizontal direction.

As described above, in the LCD according to an exemplary embodiment of the invention, the structure in which the fine branch parts are branched to be alternated with each other and the structure in which the left and the right are opened are applied to only of the pixel electrode of the red pixel, thereby improving the liquid crystal control force of the red pixel and solving the reddish problem generated at the time of implementing the curved LCD.

BRIEF DESCRIPTION OF THE DRAWINGS

The above and other exemplary embodiments, advantages and features of this invention will become more apparent by describing in further detail exemplary embodiments thereof with reference to the accompanying drawings, in which:

FIGS. 10A and 10B show liquid crystal control forces in a pixel electrode of which the left and the right are closed by an outer stem part and a pixel electrode of which the left and the right are opened, respectively.

DETAILED DESCRIPTION

Figure 1:
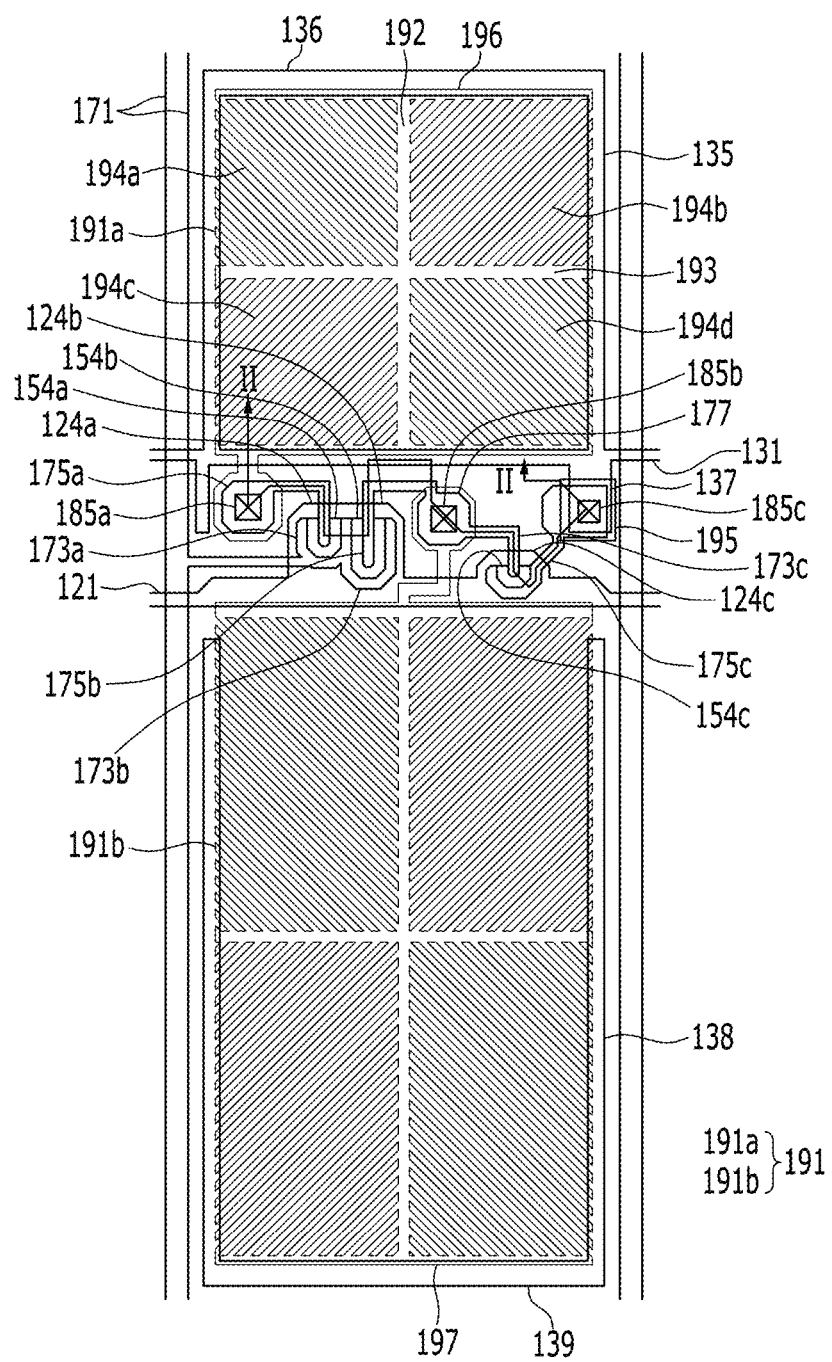
FIG. 1 is a plan view of a red pixel of a liquid crystal display ("LCD") according to an exemplary embodiment of the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Next, a liquid crystal display ("LCD") according to an exemplary embodiment of the invention will be described in detail with reference to the accompanying drawings.

Figure 2:
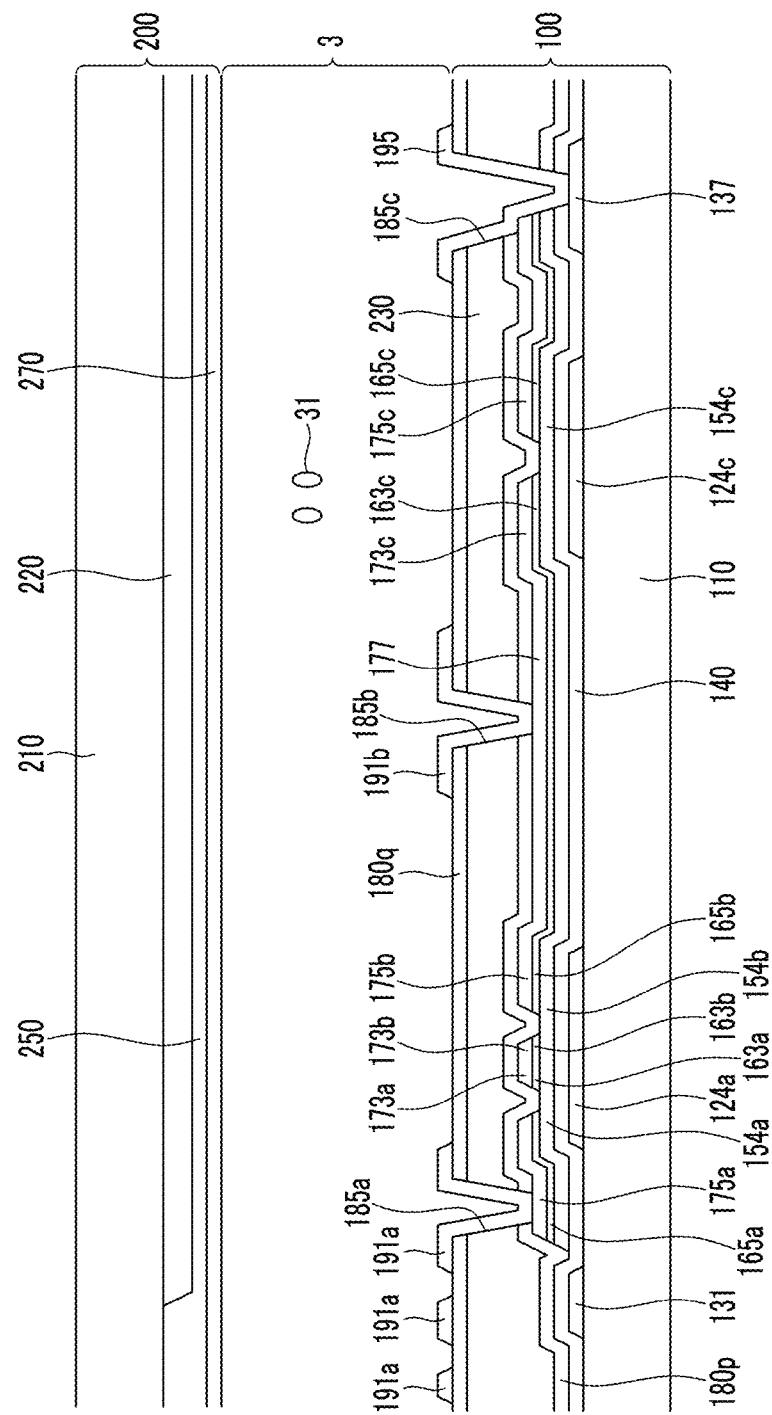
FIG. 2 is a cross-sectional view of the LCD taken along line II-II of FIG. 1.

FIG. 1 is a plan view of a red pixel of an LCD according to an exemplary embodiment of the invention. FIG. 2 is a cross-sectional view of the LCD taken along line II-II of FIG. 1.

First, a lower display panel 100 will be described.

A gate conductor including a gate line 121 and a voltage dividing reference voltage line 131 is disposed on an insulation substrate 110 including transparent glass, plastic, or the like.

The gate line 121 includes a wide end portion (not shown) for connection to a first gate electrode 124a, a second gate electrode 124b, a third gate electrode 124c, and another layer or an external driving circuit.

The voltage dividing reference voltage line 131 includes first sustain electrodes 135 and 136 and a reference electrode 137. Second sustain electrodes 138 and 139 overlapped with a second sub-pixel electrode 191b are positioned although they are not connected to the voltage dividing reference voltage line 131.

A gate insulating layer 140 is disposed on the gate line 121 and the voltage dividing reference voltage line 131.

A first semiconductor 154a, a second semiconductor 154b, and a third semiconductor 154c are disposed on the gate insulating layer 140.

A plurality of ohmic contacts 163a, 165a, 163b, 165b, 163c, and 165c are disposed on the semiconductors 154a, 154b, and 154c.

A plurality of data lines 171 including a first source electrode 173a and a second source electrode 173b, and data conductors including a first drain electrode 175a, a second drain electrode 175b, a third source electrode 173c, and a third drain electrode 175c are disposed on the ohmic contacts 163a, 165a, 163b, 165b, 163c, and 165c and the gate insulating layer 140.

The data line 171 includes a wide end portion (not shown) for connection to another layer or an external driving circuit.

The first gate electrode 124a, the first source electrode 173a, and the first drain electrode 175a form one first thin film transistor ("TFT") Qa together with a first island semiconductor 154a. A channel of the first TFT Qa is disposed on the semiconductor 154a between the first source electrode 173a and the first drain electrode 175a. Similarly, the second gate electrode 124b, the second source electrode 173b, and the second drain electrode 175b form one second TFT Qb together with a second island semiconductor 154b. A channel of the second TFT Qb is disposed on the semiconductor 154b between the second source electrode 173b and the second drain electrode 175b. Further, the third gate electrode 124c, the third source electrode 173c, and the third drain electrode 175c form one third TFT Qc together with a third island semiconductor 154c. A channel of the third TFT is disposed on the semiconductor 154c between the third source electrode 173c and the third drain electrode 175c.

The second drain electrode 175b is connected to the third source electrode 173c, and includes an extension part 177 that is widely extended.

A first passivation layer 180p is disposed on the data conductors 171, 173c, 175a, 175b, and 175c and exposed portions of the semiconductors 154a, 154b, and 154c. In an exemplary embodiment, the first passivation layer 180p may include an inorganic insulating layer including a silicon nitride, a silicon oxide, or the like. The first passivation layer 180p may prevent pigments of color filters 230 from being introduced into the exposed portions of the semiconductors 154a, 154b, and 154c.

The color filters 230 are disposed on the first passivation layer 180p. The color filters 230 are extended in a vertical direction along two data lines adjacent to each other.

A second passivation layer 180q is disposed on the color filters 230.

In an exemplary embodiment, the second passivation layer 180q may include an inorganic insulating layer including a silicon nitride, a silicon oxide, or the like. The second passivation layer 180q prevents the color filters 230 from being lifted, and suppresses pollution of a liquid crystal layer 3 due to an organic material such as a solvent introduced from the color filters 230 to prevent a defect such as an afterimage that may be caused at the time of driving a screen.

However, although a configuration in which the color filters 230 are provided in the lower display panel 100 has been described by way of example in the exemplary embodiment, the color filters 230 may also be provided in an upper display panel 200.

A first contact hole 185a and a second contact hole 185b exposing the first drain electrode 175a and the second drain electrode 175b are provided in the first passivation layer 180p and the second passivation layer 180q.

A third contact hole 185c exposing a portion of the reference electrode 137 and a portion of the third drain electrode 175c is provided in the first passivation layer 180p, the second passivation layer 180q, and the gate insulating layer 140, and is covered with a connecting member 195. The connecting member 195 electrically connects the reference electrode 137 exposed through the third contact hole 185c and the third drain electrode 175c to each other.

A plurality of pixel electrodes 191 is disposed on the second passivation layer 180q. Each pixel electrode 191 includes a first sub-pixel electrode 191a and a second sub-pixel electrode 191b separated from each other with the gate line 121 interposed therebetween and neighboring to each other in a column direction based on the gate line 121. In an exemplary embodiment, the pixel electrode 191 may include a transparent material such as an indium tin oxide ("ITO"), an indium zinc oxide ("IZO"), or the like, for example. In an exemplary embodiment, the pixel electrode 191 may also include a transparent conductive material such as an ITO, an IZO, or the like, or a reflective metal such as aluminum, silver, chromium, or an alloy thereof, etc.

The first sub-pixel electrode 191a and the second sub-pixel electrode 191b are physically and electrically connected to the first drain electrode 175a and the second drain electrode 175b through the first contact hole 185a and the second contact hole 185b, respectively, and receive data voltages applied from the first drain electrode 175a and the second drain electrode 175b. Here, some of the data voltage applied to the second drain electrode 175b is divided through the third source electrode 173c, such that a magnitude of a voltage applied to the first sub-pixel electrode 191a becomes larger than that of a voltage applied to the second sub-pixel electrode 191b.

Shapes of the first sub-pixel electrode 191a and the second sub-pixel electrode 191b will be described below in detail with reference to the accompanying drawings.

The first sub-pixel electrode 191a and the second sub-pixel electrode 191b to which the data voltages are applied generate an electric field together with a common electrode 270 of the upper display panel 200 to determine a direction of liquid crystal molecules of the liquid crystal layer 3 between two electrodes 191 and 270. A luminance of light passing through the liquid crystal layer 3 is changed depending on the direction of the liquid crystal molecules determined as described above.

A lower alignment layer (not shown) is positioned on the pixel electrode 191.

Next, the upper display panel 200 will be described.

Referring to FIG. 2, a black matrix 220 is disposed on an insulation substrate 210. The black matrix is disposed on the upper display panel 200 in regions corresponding to regions in which the data line of the lower display panel 100 and regions in which the transistors, and the like, are provided.

An overcoat 250 is disposed on the black matrix. In another exemplary embodiment, the overcoat 250 may be omitted.

The common electrode 270 is disposed on the overcoat 250. An upper alignment layer (not shown) is applied onto the common electrode 270.

Next, shapes of a first sub-pixel electrode 191a and a second sub-pixel electrode 191b of the red pixel of the LCD according to an exemplary embodiment of the invention will be described below with reference to FIG. 3.

Figure 3:
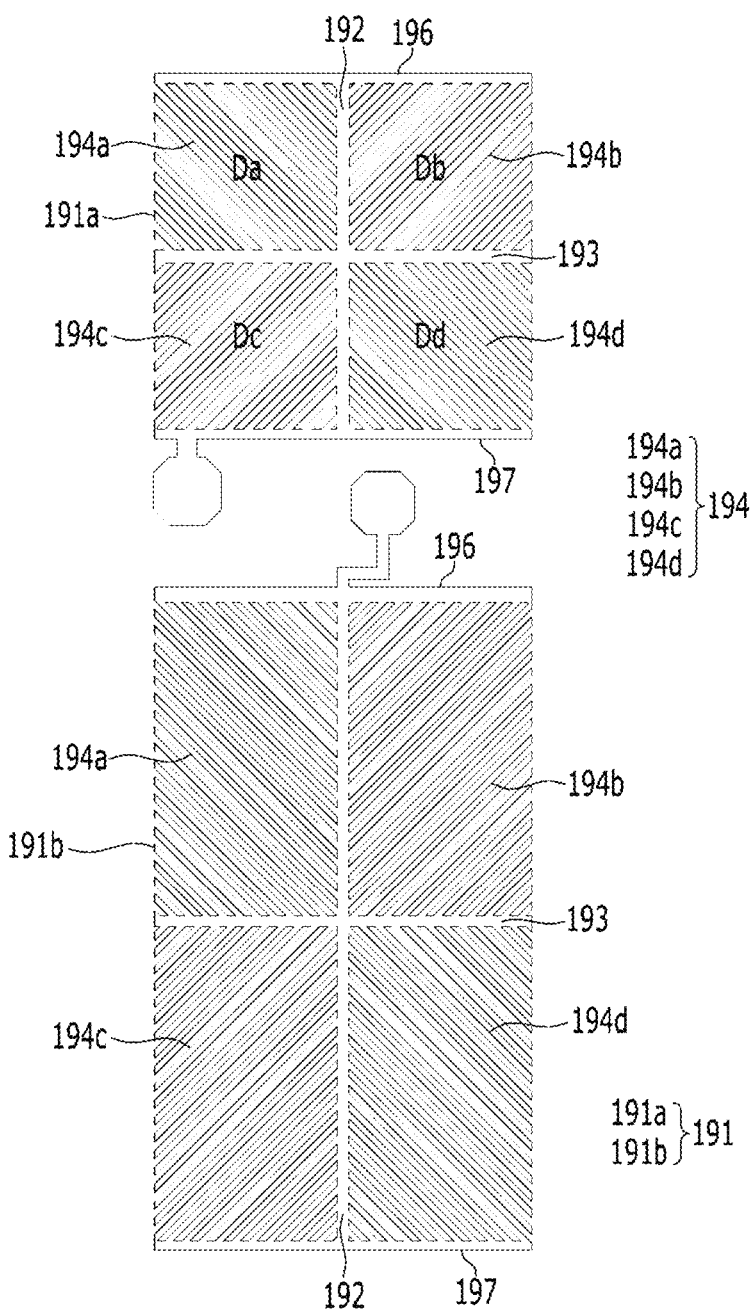
FIG. 3 shows a first sub-pixel electrode 191a and a second sub-pixel electrode 191b of the red pixel of the LCD according to an exemplary embodiment of the invention.

FIG. 3 shows a first sub-pixel electrode 191a and a second sub-pixel electrode 191b of the red pixel of the LCD according to an exemplary embodiment of the invention.

Referring to FIG. 3, the first sub-pixel electrode 191a according to an exemplary embodiment of the invention includes a cross-shaped stem part including a horizontal stem part 193 and a vertical stem part 192 orthogonal to the horizontal stem part 193. In addition, the first sub-pixel electrode 191a includes an upper end stem part 196 and a lower end stem part 197 each positioned at an upper end and a lower end thereof.

However, the invention is not limited thereto, and the upper end stem part 196 and the lower end stem part 197 may also be omitted.

In addition, the first sub-pixel electrode includes a first sub-region Da, a second sub-region Db, a third sub-region Dc and a fourth sub-region Dd divided by the horizontal stem part 193 and the vertical stem part 192, and each sub-region Da to Dd includes a plurality of first fine branch parts 194a, a plurality of second fine branch parts 194b, a plurality of third fine branch parts 194c, and a plurality of fourth fine branch parts 194d.

The first fine branch parts 194a are obliquely extended from the horizontal stem part 193 or the vertical stem part 192 toward an upper portion of the left, and the second fine branch parts 194b are obliquely extended from the horizontal stem part 193 or the vertical stem part 192 toward an upper portion of the right. In addition, the third fine branch parts 194c are obliquely extended from the horizontal stem part 193 or the vertical stem part 192 toward a lower portion of the left, and the fourth fine branch parts 194d are obliquely extended from the horizontal stem part 193 or the vertical stem part 192 toward a lower portion of the right.

Here, the fine branch parts extended from the horizontal stem part 193 or the vertical stem part 192 to both opposite sides are branched to be alternated with each other.

That is, branch points of the second fine branch parts 194b and the fourth fine branch parts 194d extended from the horizontal stem part 193 do not coincide with each other. This is similarly applied to the first fine branch parts 194a and the third fine branch parts 194c.

In addition, branch points of the first fine branch parts 194a and the second fine branch parts 194b extended from the vertical stem part 192 do not coincide with each other. This is similarly applied to the third fine branch parts 194c and the fourth fine branch parts 194d.

Although the upper end stem part 196 and the lower end stem part 197 are provided at the upper end and the lower end of the first sub-pixel electrode, respectively, as shown in FIG. 3, the stem parts are not provided at the left and the right of the first sub-pixel electrode, such that the left and the right of the first sub-pixel electrode are opened.

Likewise, a description for a shape of the second sub-pixel electrode 191b according to an exemplary embodiment of the invention is the same as the description for the shape of the first sub-pixel electrode. That is, the stem parts are not provided at the left and the right of the second sub-pixel electrode, such that the left and the right of the second sub-pixel electrode are opened, similar to the first sub-pixel electrode 191a.

However, a structure in which left and right regions of the first sub-pixel electrode 191a and the second sub-pixel electrode 191b are opened is applied to only a red pixel among a plurality of pixels provided in the LCD.

Figure 4:
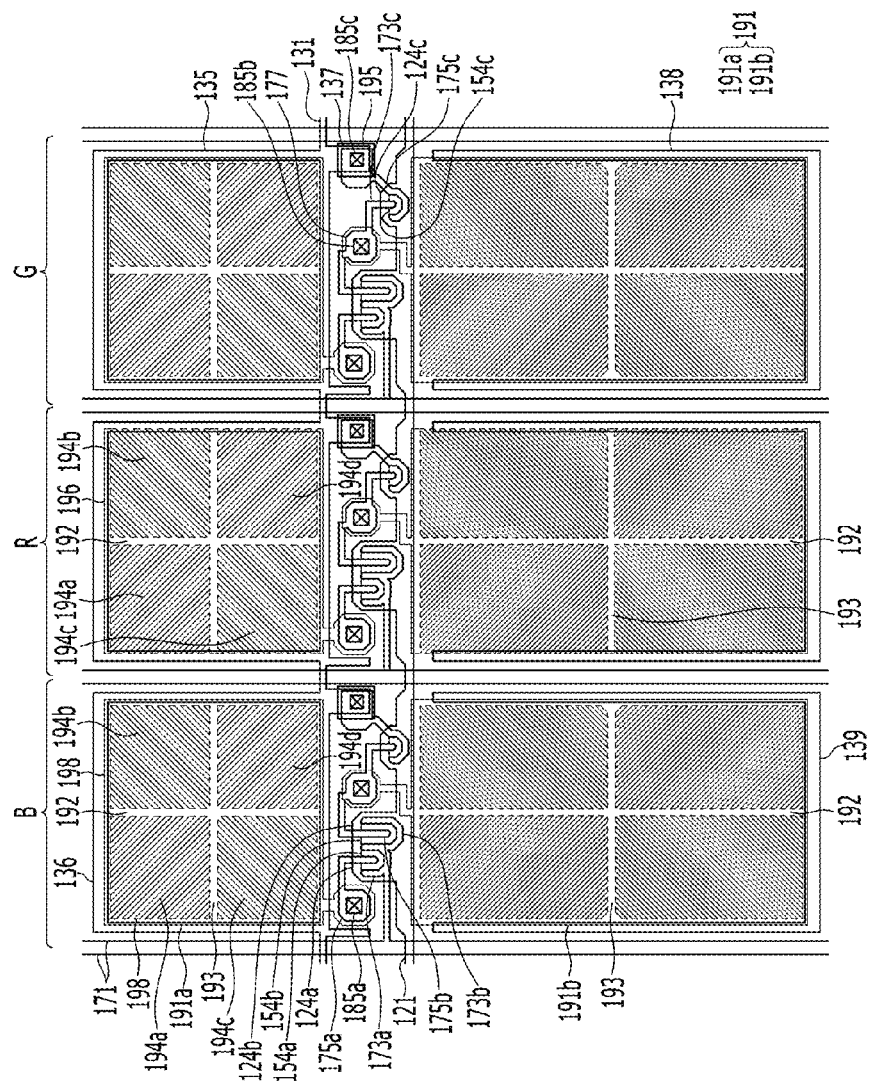
FIG. 4 shows three adjacent pixels in the LCD according to an exemplary embodiment of the invention.

FIG. 4 shows three adjacent pixels in the LCD according to an exemplary embodiment of the invention.

Referring to FIG. 4, components of all of red, green, and blue pixels except for shapes of pixel electrodes 191 are the same as each other.

However, as shown in FIG. 4, first sub-pixel electrodes and second sub-pixel electrodes of the blue pixel and the green pixel have a closed structure in which the top and bottom and the left and the right of pixel electrodes are closed.

Figure 5:
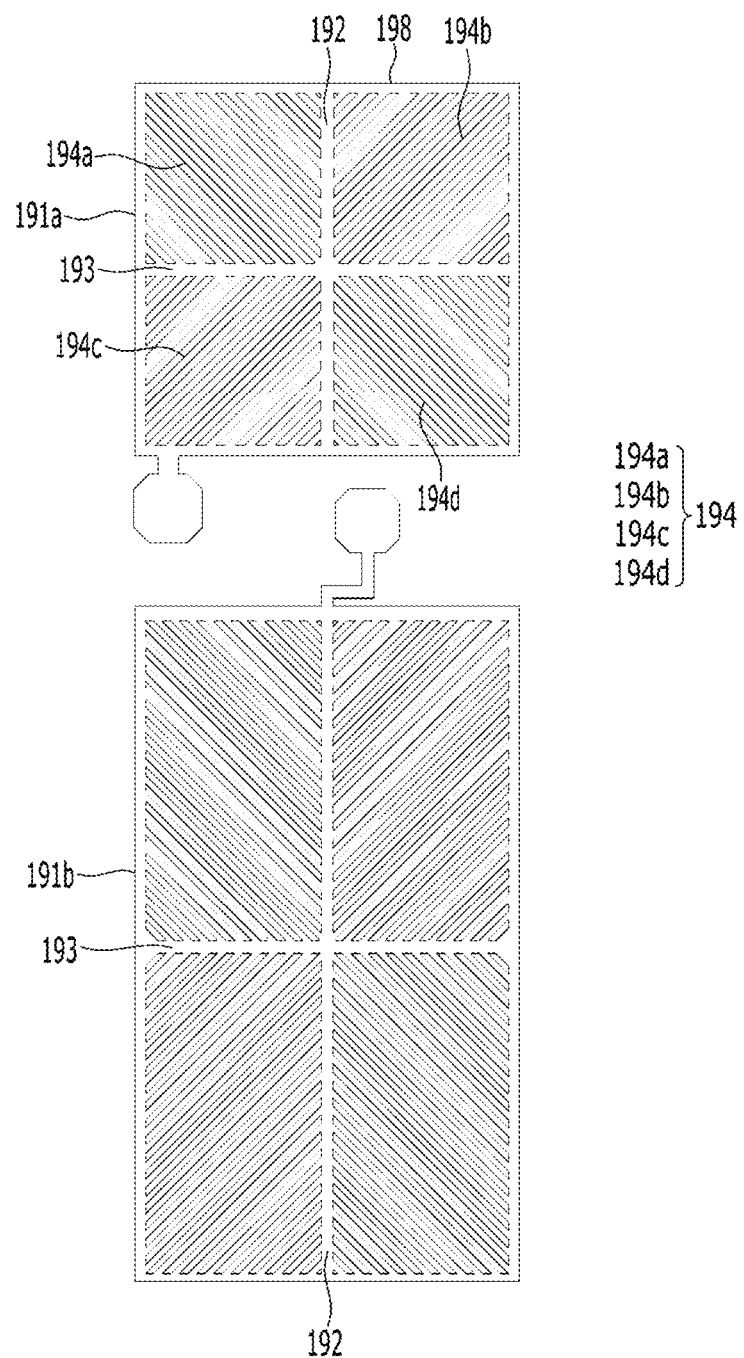
FIG. 5 shows a first sub-pixel electrode and a second sub-pixel electrode of a blue pixel or a green pixel.

First sub-pixel electrodes and second sub-pixel electrodes of a blue pixel and a green pixel will be described with reference to FIG. 5. FIG. 5 shows a first sub-pixel electrode and a second sub-pixel electrode of a blue pixel or a green pixel.

Referring to FIG. 5, each of the first sub-pixel electrodes and the second sub-pixel electrodes of the blue pixel and the green pixel includes a cross-shaped stem part including a horizontal stem part 193 and a vertical stem part 192 orthogonal to the horizontal stem part 193.

However, the first sub-pixel electrode 191a and the second sub-pixel electrode 191b of the green or blue pixel in the illustrated exemplary embodiment include the horizontal stem part 193, the vertical stem part 192, and an outer side part 198. That is, as shown in FIG. 5, top and bottom and left and right edges of the respective fine branch parts 194 are closed by the outer side part 198.

Here, the fine branch parts extended from the horizontal stem part 193 or the vertical stem part 192 to both opposite sides are branched to be symmetrical to each other.

However, unlike the pixel electrode 191 of the red pixel shown in FIG. 3, in the pixel electrodes 191 of the blue pixel and the green pixel shown in FIG. 5, branch points of the second fine branch parts 194b and the fourth fine branch parts 194d extended from the horizontal stem part 193 coincide with each other. This is similarly applied to the first fine branch parts 194a and the third fine branch parts 194c.

In addition, branch points of the first fine branch parts 194a and the second fine branch parts 194b extended from the vertical stem part 192 coincide with each other. This is similarly applied to the third fine branch parts 194c and the fourth fine branch parts 194d.

When comparing the first sub-pixel electrode 191a and the second sub-pixel electrode 191b of the pixel electrode 191 of the green or blue pixel with the first sub-pixel electrode 191a and the second sub-pixel electrode 191b of the red pixel in an exemplary embodiment shown in FIG. 3, in the first sub-pixel electrode 191a and the second sub-pixel electrode 191b of the red pixel, only the upper end stem part 196 and the lower end stem part 197 are provided, and the stem parts are not provided at the left and the right of the first sub-pixel electrode 191a and the second sub-pixel electrode 191b, such that the left and the right of the first sub-pixel electrode 191a and the second sub-pixel electrode 191b are opened.

However, as shown in FIGS. 4 and 5, in the first sub-pixel electrode 191a and the second sub-pixel electrode 191b of the green pixel or the blue pixel in the exemplary embodiment, the outer side part 198 closing all of the top and bottom and the left and right is provided. That is, all of the top and bottom and the left and right of the first sub-pixel electrode 191a and the second sub-pixel electrode 191b are closed.

In addition, in the case of the pixel electrode 191 of the red pixel in the exemplary embodiment shown in FIG. 3, the branch points of the respective fine branch parts 194 for the horizontal stem part 193 and the vertical stem part 192 are alternated with each other. As shown in FIG. 5, in the case in which the pixel electrodes 191 of the green pixel and the blue pixel, the branch points of the fine branch parts 194 for the horizontal stem part 193 and the vertical stem part 192 coincide with each other.

That is, in the LCD according to an exemplary embodiment of the invention, as shown in FIG. 4, a shape of the pixel electrode of the red pixel is different from those of the pixel electrodes of the green and blue pixels.

Due to a difference between the shapes of the pixel electrodes 191, in the LCD according to an exemplary embodiment of the invention, a reddish problem generated in the case of curving the LCD in a curved shape is solved.

Next, an effect of the LCD according to an exemplary embodiment of the invention will be described in detail.

In the case of implementing a curved LCD by curving the LCD having a structure as shown in FIG. 4, a texture is generated due to misalignment between an upper plate and a lower plate. That is, in the case of forming a curved LCD by curving the LCD in which the upper display panel and the lower display panel are coupled to each other, since curvatures of the upper display panel and the lower display panel are not same as each other, misalignment is generated, such that the texture is generated in a liquid crystal layer.

Figure 6A:
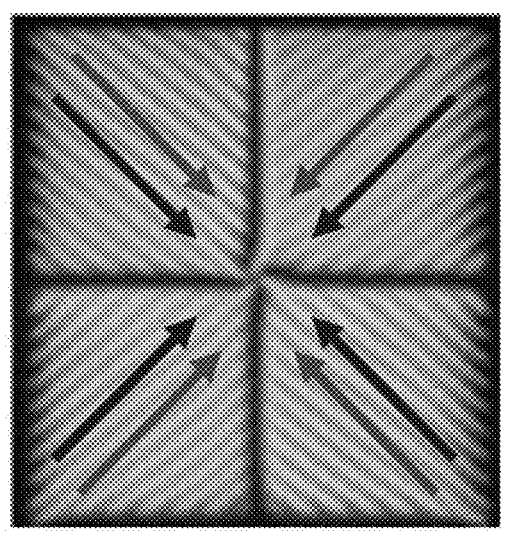
FIG. 6A shows a pixel electrode and directions of liquid crystal control forces applied to the pixel electrode before the LCD is curved.
Figure 6B:
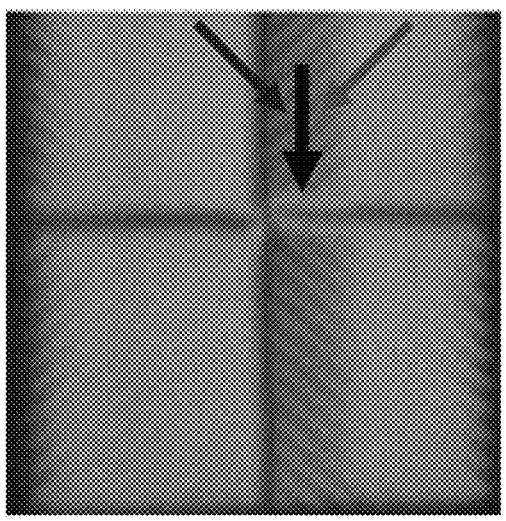
FIG. 6B shows directions of liquid crystal control forces in the case in which misalignment is generated by curving the LCD.

FIG. 6A shows a pixel electrode and directions of liquid crystal control forces applied to the pixel electrode before the LCD is curved. FIG. 6B shows directions of liquid crystal control forces in the case in which misalignment is generated by curving the LCD.

Referring to FIG. 6A, before the LCD is curved, liquid crystal control forces applied to one pixel electrode in both directions were balanced. That is, pre-tilts (represented by darker arrows) and pre-tilts (represented by lighter arrows) were balanced, such that a texture was not generated.

However, referring to FIG. 6B, in the case of curving the LCD, misalignment between an upper plate and a lower plate is generated, such that a pre-tilt (represented by a blue arrow) and a pre-tilt (represented by a red arrow) are not balanced.

Therefore, liquid crystal control forces are generated in a direction as shown by a block arrow in FIG. 6B, and liquid crystals are arranged in different directions in this region, such that it is viewed as a texture as shown in FIG. 6B. The generation of the texture leads to a luminance decrease.

Here, before the LCD is curved, a liquid crystal control force in the red pixel among three color pixels such as the red pixel, the green pixel, and the blue pixel is the weakest. Therefore, since a luminance in the red pixel is decreased as compared with the other color pixels before the LCD is curved, in the case of curving the LCD, the generation of the texture may be the smallest in the red pixel, and a luminance decrease rate appearing in the red pixel may be lower than luminance decrease rates appearing in the other color pixels.

Figure 7A:
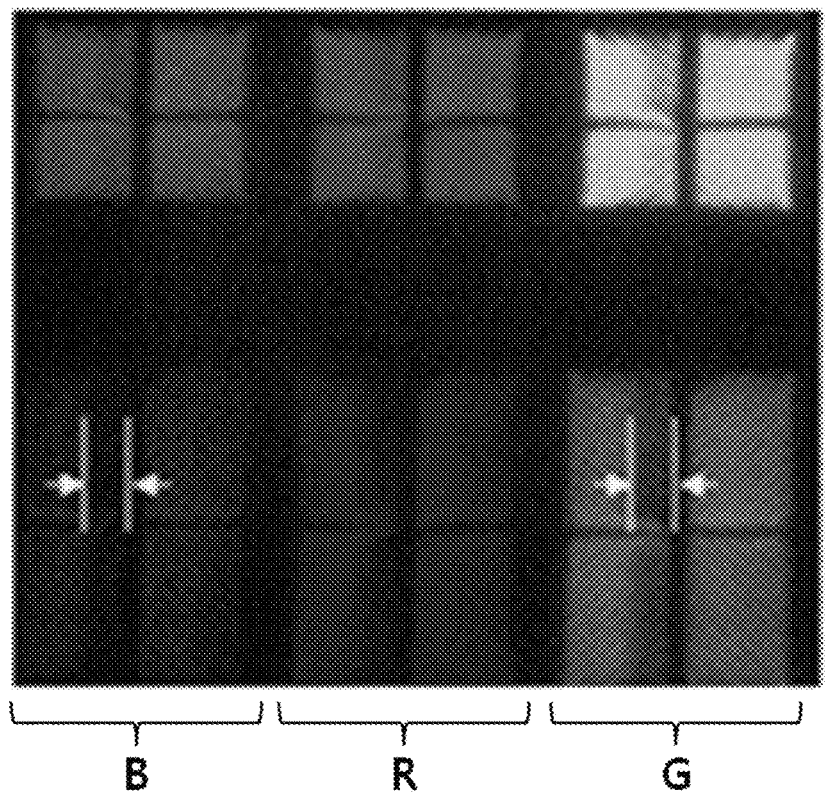
FIGS. 7A and 7B are images in which a texture is generated in the LCD.
Figure 7B:
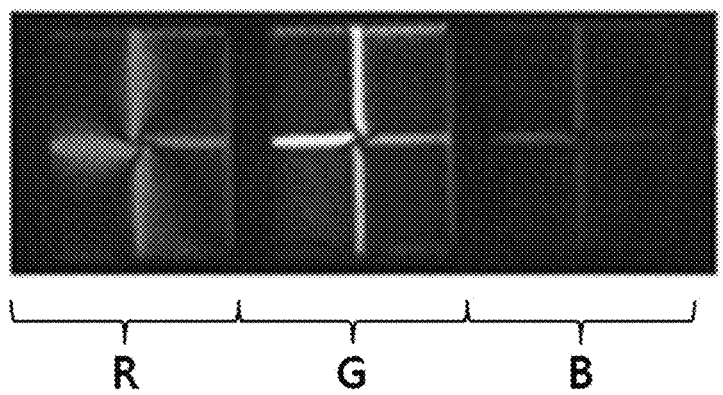

FIGS. 7A and 7B are images in which a texture is generated in the LCD. Referring to FIG. 7A, it may be appreciated that a width of the generated texture is the narrowest in the red pixel. That is, the smallest luminance decrease appears in the red pixel.

This may be confirmed through FIG. 7B. As shown in FIG. 7B, it may be confirmed that the brightest portion largely appears in the red pixel. The reason is that the smallest luminance decrease amount appears in the red pixel due to a low liquid crystal control force of the red pixel in the case of curving the LCD, as described above.

The reason why the liquid crystal control force is low in the red pixel is that a cell gap of the red pixel is generally smaller, e.g., about 0.2 micrometer (μm), than those of the other color pixels and a permittivity of the red pixel is higher than those of the other color pixels by about 0.2. Since the cell gap of the red pixel is lower than those of the other color pixels and the permittivity of the red pixel is higher than those of the other color pixels as described above, the liquid crystal control force in the red pixel is lower than those of the other color pixels.

Since the liquid crystal control force in the red pixel is low as described above, a pre-tilt level provided by exposure in a manufacturing process of the LCD is also the lowest in the red pixel. That is, even before the LCD is curved, a luminance of the red pixel is lower than those of the other color pixels due to the low liquid crystal control force of the red pixel.

Then, when the LCD is curved, since the red pixel is already in a state in which the luminance thereof is low, a luminance decrease of the red pixel is lower than those of the other color pixels in the curved LCD.

Figure 8:
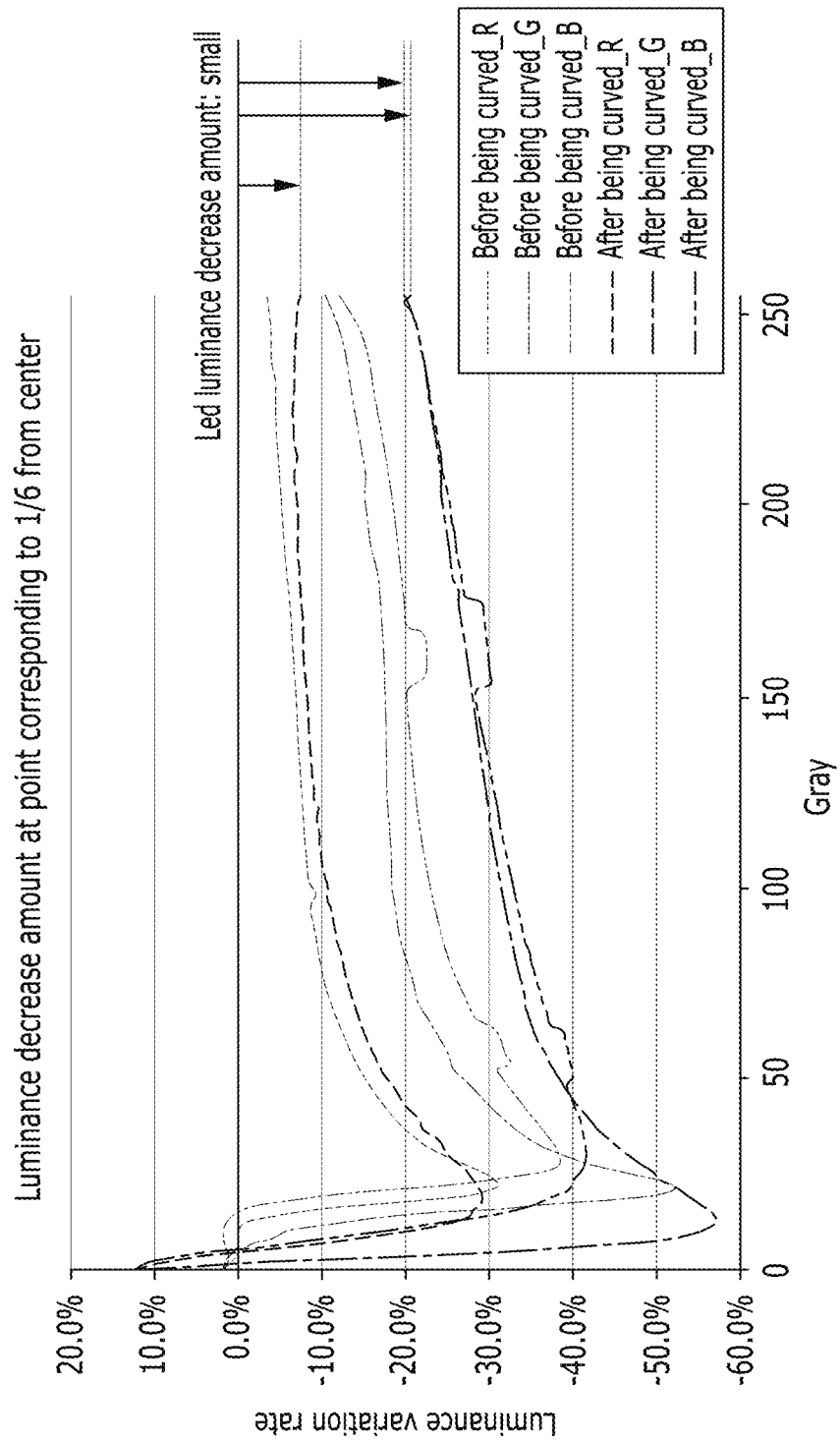
FIG. 8 is a graph showing a luminance decrease amount of each pixel before and after the LCD is curved.

FIG. 8 is a graph showing a luminance decrease amount of each pixel before and after the LCD is curved. Referring to FIG. 8, it may be confirmed that a luminance decrease amount in the red pixel is the smallest before and after the LCD is curved.

Since a luminance decrease level of the red pixel is lower than those of the other color pixels in the curved LCD, as described above, a problem such as a reddish phenomenon that an image of the curved LCD looks like a red color has occurred.

However, in the LCD according to an exemplary embodiment of the invention, as described above, an alternated structure of the fine branch parts and a structure in which the left and the right are opened are applied to only the red pixel, thereby increasing the liquid crystal control force in the red pixel. Therefore, the problem such as the reddish phenomenon generated in the curved LCD is solved.

That is, in the case of the LCD according to an exemplary embodiment of the invention, only the pixel electrode in the red pixel among three pixels such as R, G, and B pixels is provided in a shape different from those of the pixel electrodes in the other color pixels. In order to increase a relatively insufficient liquid crystal control force of the red pixel, the pixel electrode of the red pixel has the alternated structure and has the structure in which the left and right regions thereof are opened.

Therefore, the liquid crystal control force of the red pixel is improved as compared with an existing structure (structure in which the pixel electrodes of the red pixel, the blue pixel, and the green pixel are the same as each other), and the reddish problem in the curved LCD due to the insufficiency of the liquid crystal control force of the red pixel is solved.

Figure 9A:
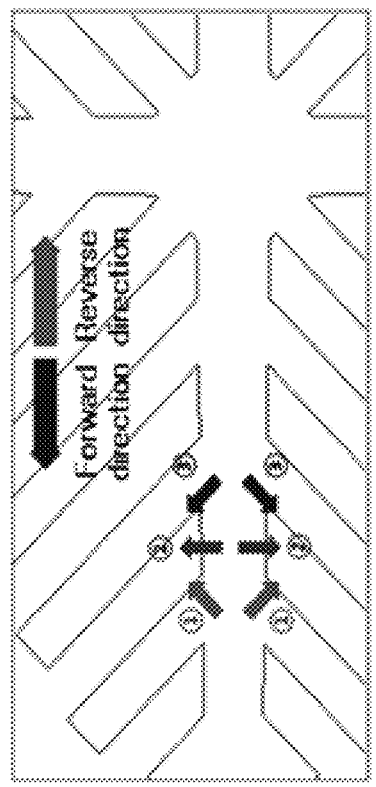
FIGS. 9A and 9B show liquid crystal control forces in a pixel electrode to which an alternated structure is not applied and a pixel electrode to which the alternated structure is applied, respectively.
Figure 9B:
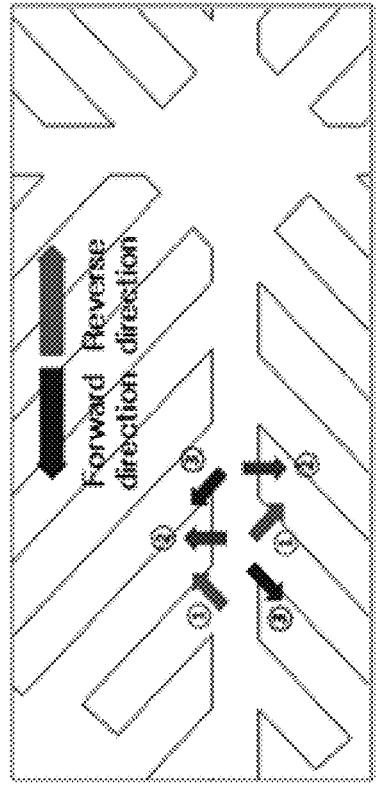

FIGS. 9A and 9B show liquid crystal control forces in a pixel electrode to which an alternated structure is not applied and a pixel electrode to which the alternated structure is applied, respectively.

Referring to FIG. 9A, in the pixel electrode to which the alternated structure is not applied, forces acting on the fine branch parts are symmetrical to each other. Therefore, liquid crystals collide with each other in the vicinity of the horizontal stem part, such that they are arranged in one direction, which is viewed as a black, as shown in FIG. 9A.

However, referring to FIG. 9B, in the pixel electrode to which the alternated structure is applied, forces acting on the fine branch parts of the pixel electrode are alternated with each other. Therefore, as shown in FIG. 9B, large collision between the liquid crystals is not generated.

Referring to a left image of FIG. 9A, in the vicinity of the horizontal stem part of the pixel electrode to which the alternated structure is not applied, the liquid crystals to which forces in different directions are applied collide with each other, such that they are arranged in one direction, which appears as the black in the vicinity of the horizontal stem part.

However, referring to a left image of FIG. 9B, in the vicinity of the horizontal stem part of the pixel electrode to which the alternated structure is applied, collision of the liquid crystals is dispersed, such that the colliding liquid crystals are not arranged in one direction as in FIG. 9A. That is, when comparing FIG. 9B with FIG. 9A, an area appearing as the black is significantly smaller in FIG. 9B than in FIG. 9A. That is, it may be confirmed that the liquid crystal control force is further increased.

In addition, FIGS. 10A and 10B show liquid crystal control forces in a pixel electrode of which the left and the right are closed by an outer stem part and a pixel electrode of which the left and the right are opened, respectively. Referring to FIGS. 10A and 10B, it may be confirmed that a dark portion is less viewed in the pixel electrode of FIG. 10B of which the left and the right are opened than in the pixel electrode of FIG. 10A.

That is, in the case of applying a closed structure as shown in FIG. 10A, forces act inwardly and outwardly at an outer side part. In this case, a liquid crystal control force in a diagonal direction is partially offset by the force acting outwardly.

However, in the case in which the left and the right of the pixel electrode are opened as shown in FIG. 10B, a force acting from the outer side part is not present, such that a liquid crystal control force in the diagonal direction may be wholly maintained. Therefore, the liquid crystal control force is generally increased.

As described above, in the LCD according to an exemplary embodiment of the invention, in order to solve the relatively insufficient liquid crystal control force of the red pixel and the reddish problem due to the relatively insufficient liquid crystal control force of the red pixel, the alternated structure of the fine branch parts and the structure in which the left and the right of the pixel electrode are opened are applied to only the pixel electrode of the red pixel, thereby increasing the liquid crystal control force of the red pixel. Therefore, the reddish problem generated in the curved LCD is solved.

Next, a driving method of the LCD according to an exemplary embodiment of the invention will be described with reference to FIGS. 11 to 15. FIGS. 11 to 15 are equivalent circuit diagrams of one pixel of the LCD according to an exemplary embodiment of the invention.

Figure 11:
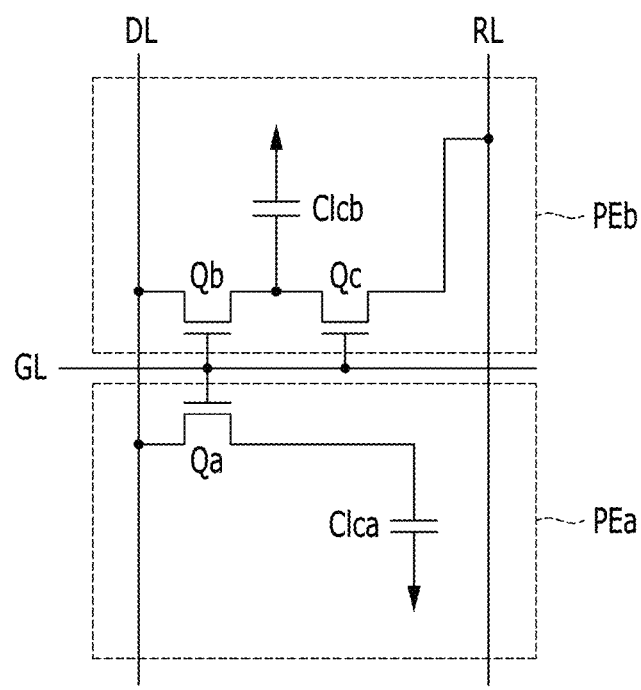
FIGS. 11 to 15 are equivalent circuit diagrams of one pixel of the LCD according to an exemplary embodiment of the invention.

First, referring to FIG. 11, one pixel PX of the LCD according to the exemplary embodiment includes a plurality of signal lines including a gate line GL transferring a gate signal, a data line DL transferring a data signal, and a voltage dividing reference voltage line RL transferring a voltage dividing reference voltage, first, second, and third switching elements Qa, Qb, and Qc connected to the plurality of signal lines, and first and second liquid crystal capacitors Clca and Clcb.

Each of the first and second switching elements Qa and Qb is connected to the gate line GL and the data line DL, and the third switching element Qc is connected to an output terminal of the second switching element Qb and the voltage dividing reference voltage line RL.

The first switching element Qa and the second switching element Qb, which are three-terminal elements such as TFTs, or the like, have control terminals connected to the gate line GL and input terminals connected to the data line DL, respectively, an output terminal of the first switching element Qa is connected to the first liquid crystal capacitor Clca, and the output terminal of the second switching element Qb is connected to the second liquid crystal capacitor Clcb and an input terminal of the third switching element Qc.

The third switching element Qc, which is also a three-terminal element such as a TFT, or the like, has a control terminal connected to the gate line GL, the input terminal connected to the second liquid crystal capacitor Clcb, and an output terminal connected to the voltage dividing reference voltage line RL.

When a gate-on signal is applied to the gate line GL, the first switching element Qa, the second switching element Qb, and the third switching element Qc connected to the gate line are turned on. Therefore, a data voltage applied to the data line DL is applied to a first sub-pixel electrode PEa and a second sub-pixel electrode PEb through the first switching element Qa and the second switching element Qb that are turned on. Here, the data voltages applied to the first sub-pixel electrode PEa and the second sub-pixel electrode PEb are the same as each other, and the first liquid crystal capacitor Clca and the second liquid crystal capacitor Clcb are charged with the same value corresponding to a difference between a common voltage and the data voltage. At the same time, a voltage charged in the second liquid crystal capacitor Clcb is divided through the turned-on third switching element Qc. Therefore, the voltage value charged in the second liquid crystal capacitor Clcb is lowered by a difference between the common voltage and the voltage dividing reference voltage. That is, a voltage charged in the first liquid crystal capacitor Clca becomes higher than the voltage charged in the second liquid crystal capacitor Clcb.

As described above, the voltage charged in the first liquid crystal capacitor Clca and the voltage charged in the second liquid crystal capacitor Clcb become different from each other. Since the voltage of the first liquid crystal capacitor Clca and the voltage of the second liquid crystal capacitor Clcb are different from each other, angles at which liquid crystal molecules are inclined in a first sub-pixel and a second sub-pixel are different from each other, such that luminances of two sub-pixels are different from each other. Therefore, when the voltage of the first liquid crystal capacitor Clca and the voltage of the second liquid crystal capacitor Clcb are appropriately adjusted, an image viewed from a side may become as close to an image viewed from a front as possible, such that side visibility may be improved.

Although an exemplary embodiment in which the pixel includes the third switching element Qc connected to the second liquid crystal capacitor Clcb and the voltage dividing reference voltage line RL in order to make the voltage charged in the first liquid crystal capacitor Clca and the voltage charged in the second liquid crystal capacitor Clcb different from each other has been shown, in the case of an LCD according to another exemplary embodiment of the invention, the second liquid crystal capacitor Clcb may also be connected to a step-down capacitor. In detail, the pixel includes a third switching element including a first terminal connected to a step-down gate line, a second terminal connected to the second liquid crystal capacitor Clcb, and a third terminal connected to the step-down capacitor to allow some of electric charges charged in the second liquid crystal capacitor Clcb to be charged in the step-down capacitor, thereby making it possible to set voltages charged in the first liquid crystal capacitor Clca and the second liquid crystal capacitor Clcb to be different from each other. In addition, in the case of the LCD according to another exemplary embodiment of the invention, the first liquid crystal capacitor Clca and the second liquid crystal capacitor Clcb are connected to different data lines to receive different data voltages, thereby making it possible to set voltages charged in the first liquid crystal capacitor Clca and the second liquid crystal capacitor Clcb to be different from each other. Voltages charged in the first liquid crystal capacitor Clca and the second liquid crystal capacitor Clcb may be set to be different from each other by several methods other than the above-mentioned method.

Figure 12:
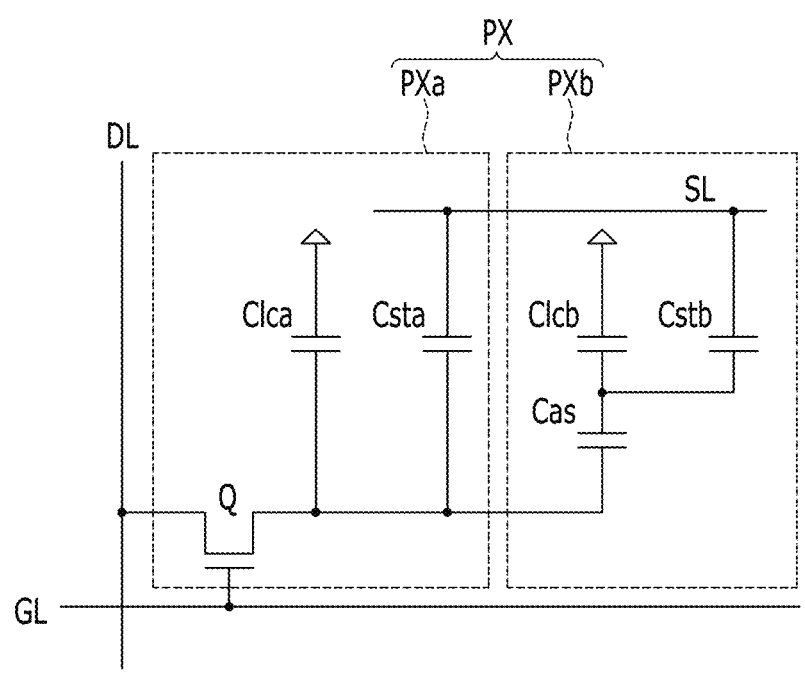

Next, an exemplary embodiment of FIG. 12 will be described.

The LCD according to an exemplary embodiment of the invention includes signal lines including a plurality of gate lines GLs, a plurality of data lines DL, and a plurality of sustain electrode lines SL and a plurality of pixels PX connected to the signal lines. Each pixel PX includes a pair of first and second sub-pixels PXa and PXb. A first sub-pixel electrode is provided in the first sub-pixel PXa, and a second sub-pixel electrode is provided in the second sub-pixel PXb.

The LCD according to an exemplary embodiment of the invention further includes a switching element Q connected to the gate line GL and the data line DL, a first liquid crystal capacitor Clca and a first storage capacitor Csta connected to the switching element Q and provided in the first sub-pixel PXa, a second liquid crystal capacitor Clcb and a second storage capacitor Cstb connected to the switching element Q and provided in the second sub-pixel PXb, and an auxiliary capacitor Cas provided between the switching element Q and the second liquid crystal capacitor Clcb.

The switching element Q, which is a three-terminal element such as a TFT, or the like, provided in the lower display panel 100, has a control terminal connected to the gate line GL, an input terminal connected to the data line DL, and an output terminal connected to the first liquid crystal capacitor Clca, the first storage capacitor Csta, and the auxiliary capacitor Cas.

One terminal of the auxiliary capacitor Cas is connected to the output terminal of the switching element Q, and the other terminal of the auxiliary capacitor Cas is connected to the second liquid crystal capacitor Clcb and the second storage capacitor Cstb.

A voltage charged in the second liquid crystal capacitor Clcb becomes lower than a voltage charged in the first liquid crystal capacitor Clca by the auxiliary capacitor Cas, thereby making it possible to improve side visibility of the LCD.

Figure 13:
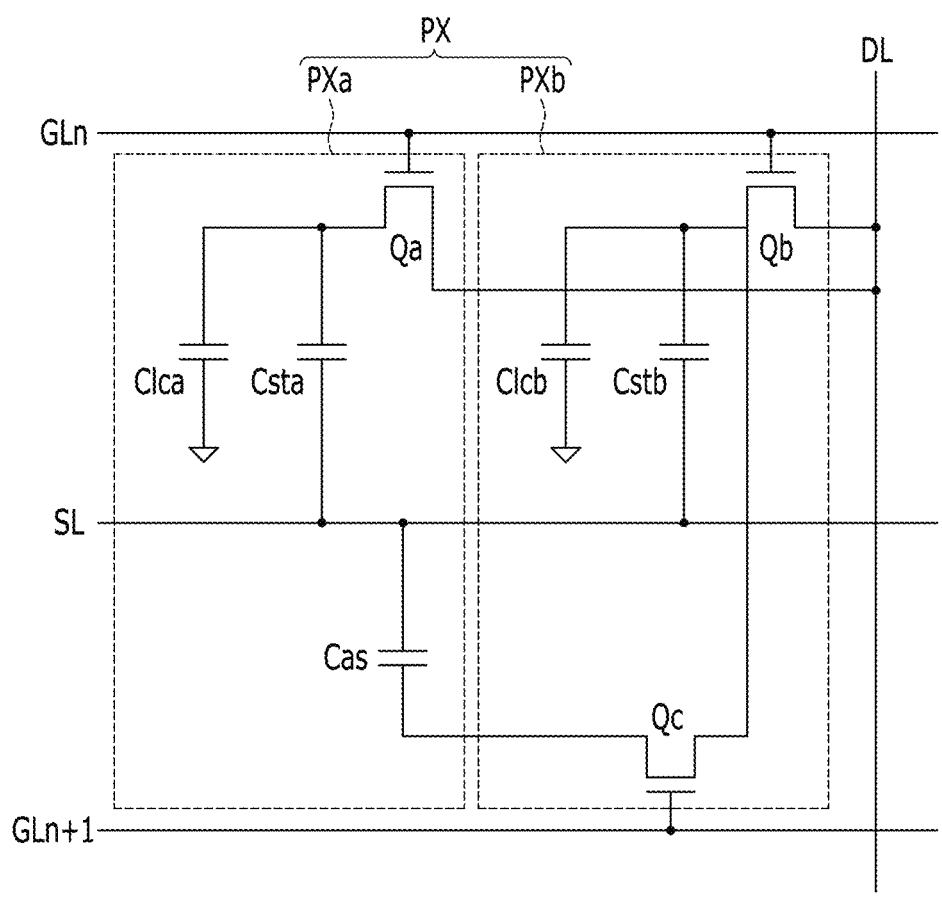

Hereinafter, an exemplary embodiment of FIG. 13 will be described.

The LCD according to an exemplary embodiment of the invention includes signal lines including a plurality of gate lines GLn and GLn+1, a plurality of data lines DL, and a plurality of sustain electrode lines SL and a plurality of pixels PX connected to the signal lines. Each pixel PX includes a pair of first and second sub-pixels PXa and PXb. A first sub-pixel electrode is provided in the first sub-pixel PXa, and a second sub-pixel electrode is provided in the second sub-pixel PXb.

The LCD according to an exemplary embodiment of the invention further includes a first switching element Qa and a second switching element Qb connected to the gate line GLn and the data line DL, a first liquid crystal capacitor Clca and a first storage capacitor Csta connected to the first switching element Qa and provided in the first sub-pixel PXa, a second liquid crystal capacitor Clcb and a second storage capacitor Cstb connected to the second switching element Qb and provided in the second sub-pixel PXb, a third switching element Qc connected to the second switching element Qb and switched by the next stage of gate line GLn+1, and an auxiliary capacitor Cas connected to the third switching element Qc.

The first switching element Qa and the second switching element Qb, which are three-terminal elements such as TFTs, or the like, provided in the lower display panel 100, have control terminals connected to the gate line GLn, input terminals connected to the data line DL, and output terminals connected to the first liquid crystal capacitor Clca and the first storage capacitor Csta, and the second liquid crystal capacitor Clcb and the second storage capacitor Cstb, respectively.

The third switching element Qc, which is also a three-terminal element such as a TFT, or the like, provided in the lower display panel 100 (refer to FIG. 2), has a control terminal connected to the next stage of gate line GLn+1, an input terminal connected to the second liquid crystal capacitor Clcb, and an output terminal connected to the auxiliary capacitor Cas.

One terminal of the auxiliary capacitor Cas is connected to the output terminal of the third switching element Qc, and the other terminal of the auxiliary capacitor Cas is connected to the sustain electrode line SL.

An operation of the LCD according to an exemplary embodiment of the invention will be described. When a gate-on voltage is applied to the gate line GLn, the first switching element and the second switching elements Qa and Qb connected to the gate line GLn are turned on, and a data voltage of the data line DL is applied to the first and second sub-pixel electrodes.

Then, when a gate-off voltage is applied to the gate line GLn and the gate-on voltage is applied to the next stage of gate line (GLn+1), the first and second switching elements Qa and Qb are turned off, and the third switching element Qc is turned on. Therefore, electric charges of the second sub-pixel electrode connected to the output terminal of the second switching element Qb flow into the auxiliary capacitor Cas, such that a voltage of the second liquid crystal capacitor Clcb drops.

The side visibility of the LCD may be improved by making voltages charged in the first and second liquid crystal capacitors Clca and Clcb different from each other as described above.

Figure 14:
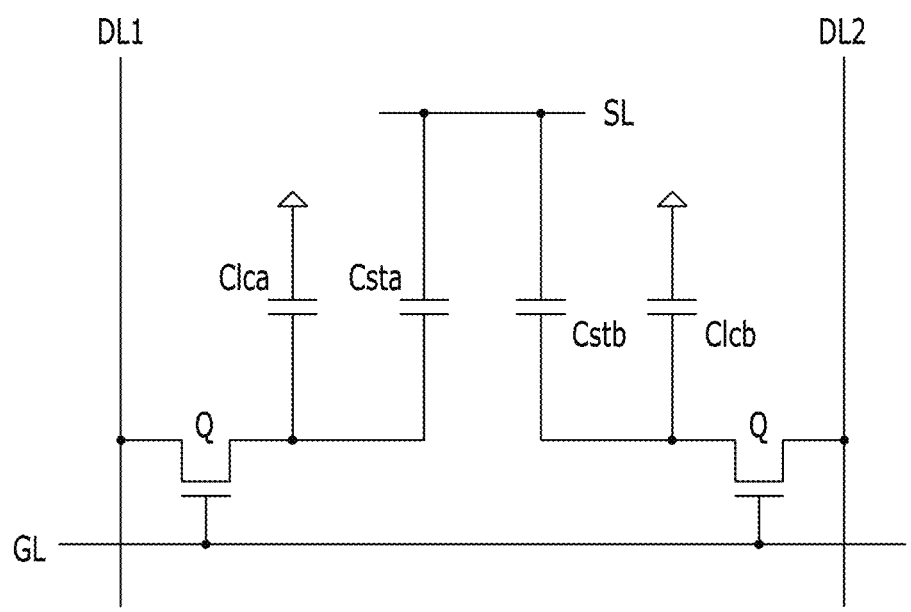

Hereinafter, an exemplary embodiment of FIG. 14 will be described.

The LCD according to an exemplary embodiment of the invention includes signal lines including a plurality of gate lines GL, a plurality of data lines DL1 and DL2, and a plurality of sustain electrode lines SL and a plurality of pixels PX connected to the signal lines. Each pixel PX includes a pair of first and second liquid crystal capacitors Clca and Clab and first and second storage capacitors Csta and Cstb.

Each sub-pixel includes one liquid crystal capacitor and one storage capacitor, and additionally includes one TFT Q. TFTs Q of two sub-pixels belonging to one pixel are connected to the same gate line GL, but are connected to different data lines DL1 and DL2, respectively. Different levels of data voltages are simultaneously applied to the different data lines DL1 and DL2 to allow the first and second liquid crystal capacitors Clca and Clcb of the two sub-pixels to be charged with different voltages. As a result, the side visibility of the LCD may be improved.

Hereinafter, an exemplary embodiment of FIG. 15 will be described.

Figure 15:
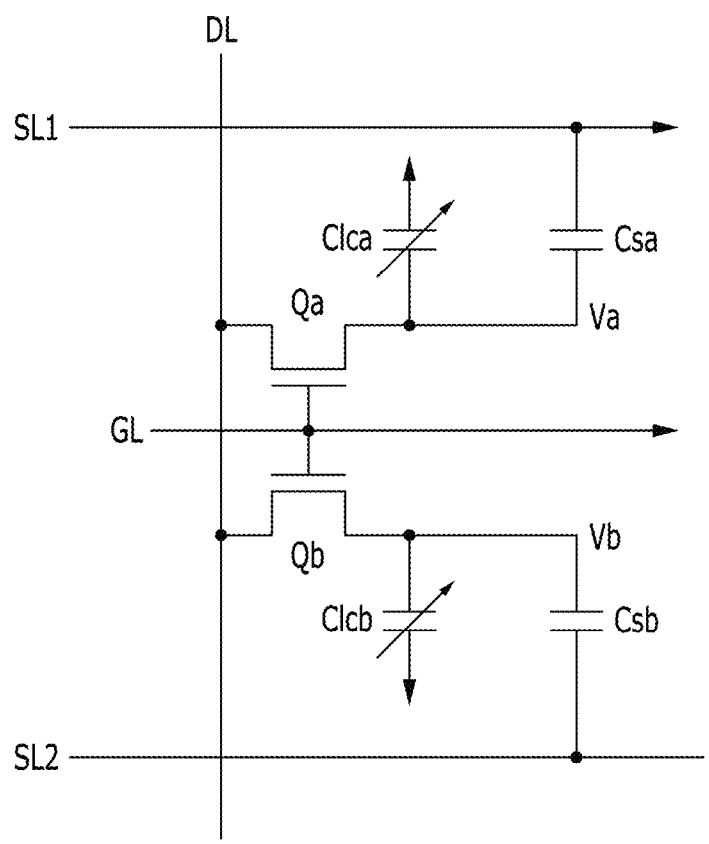

The LCD according to an exemplary embodiment of the invention includes a gate line GL, a data line DL, a first power supply line SL1, a second power supply line SL2, and a first switching element Qa and second switching element Qb connected to the gate line GL and the data line DL, as shown in FIG. 15.

The LCD according to an exemplary embodiment of the invention further includes an auxiliary step-up capacitor Csa and a first liquid crystal capacitor Clca connected to the first switching element Qa, and an auxiliary step-down capacitor Csb and a second liquid crystal capacitor Clcb connected to the second switching element Qb.

The first switching element Qa and the second switching element Qb include a three-terminal element such as a TFT, or the like. The first switching element Qa and the second switching element Qb are connected to the same gate line GL and the same data line DL, such that they are turned on at the same timing to output the same data signals.

Voltages which swing at a predetermined period are applied to the first power supply line SL1 and the second power supply line SL2. A first low voltage is applied to the first power supply line SL1 for a predetermined period (for example, 1H), and a first high voltage is applied to the first power supply line SL1 for the next predetermined period. A second high voltage is applied to the second power supply line SL2 for a predetermined period, and a second low voltage is applied to the second power supply line SL2 for the next predetermined period. Here, first and second periods are repeated plural times for one frame, such that the voltages which repeatedly swing at a predetermined period are applied to the first power supply line SL1 and the second power supply line SL2. In an exemplary embodiment, the first low voltage and the second low voltage may be the same as each other, and the first high voltage and the second high voltage may also be the same as each other.

The auxiliary step-up capacitor Csa is connected to the first switching element Qa and the first power supply line SL1, and the auxiliary step-down capacitor Csb is connected to the second switching element Qb and the second power supply line SL2.

A voltage Va of a terminal (hereinafter, also referred to as a 'first terminal') of a portion at which the auxiliary step-up capacitor Csa is connected to the first switching element Qa becomes low when the first low voltage is applied to the first power supply line SL1 and becomes high when the first high voltage is applied to the first power supply line SL1. Then, as the voltage of the first power supply line SL1 swings, the voltage Va of the first terminal swings.

Similarly, a voltage Vb of a terminal (hereinafter, also referred to as a 'second terminal') of a portion at which the auxiliary step-down capacitor Csb is connected to the second switching element Qb becomes low when the second low voltage is applied to the second power supply line SL2 and becomes high when the second high voltage is applied to the second power supply line SL2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a gate line disposed on the first substrate;
   an insulating layer disposed on the gate line; and
   a plurality of pixel electrodes disposed on the insulating layer,
   wherein the plurality of pixel electrodes includes a first pixel electrode, a second pixel electrode, and a third pixel electrode neighboring to each other,
   each of the first pixel electrode, the second pixel electrode, and the third pixel electrode includes a vertical stem part, a horizontal stem part intersecting with the vertical stem part, and fine branch parts extended from each horizontal stem part and each vertical stem part to both opposite sides in a diagonal direction,
   the fine branch parts of the first pixel electrode are alternately branched to the both opposite sides of the horizontal stem part and the vertical stem part, and the second pixel electrode and the third pixel electrode include an outer side part enclosing an edge of each pixel electrode, wherein branch points of the fine branch parts of the first pixel electrode that are alternately branched to the both opposite sides of the horizontal stem part and the vertical stem part do not coincide with each other, and wherein branch points of the fine branch parts of the second pixel electrode and the third pixel electrode extended from the horizontal stem part and the vertical stem part coincide with each other.

2. The liquid crystal display of claim 1, further comprising:

color filters each provided in regions corresponding to the first pixel electrode, the second pixel electrode, and the third pixel electrode, wherein a red color filter is provided in a region corresponding to the first pixel electrode.

3. The liquid crystal display of claim 2, wherein:

a green color filter is provided in a region corresponding to the second pixel electrode, and a blue color filter is provided in a region corresponding to the third pixel electrode.

4. The liquid crystal display of claim 1, wherein:

the fine branch parts of the second pixel electrode and the third pixel electrode are branched to both opposite sides of the horizontal stem part and the vertical stem part so as to be symmetrical to each other.

5. The liquid crystal display of claim 1, wherein:

the first pixel electrode includes an upper end stem part and a lower end stem part positioned at both ends of the vertical stem part and orthogonal to the vertical stem part.

6. The liquid crystal display of claim 1, wherein:

the liquid crystal display includes a portion curved in a horizontal direction.

7. The liquid crystal display of claim 1, wherein:

each of the first pixel electrode, the second pixel electrode, and the third pixel electrode includes a first sub-pixel electrode and a second sub-pixel electrode.

8. The liquid crystal display of claim 7, wherein:

the first sub-pixel electrode and the second sub-pixel electrode are positioned with the gate line interposed therebetween, and the second sub-pixel electrode has a size larger than that of the first sub-pixel electrode.

9. The liquid crystal display of claim 8, wherein:

each of the first sub-pixel electrode and the second sub-pixel electrode of the first pixel electrode includes a vertical stem part, a horizontal stem part intersecting with the vertical stem part, and fine branch parts extended from each horizontal stem part and each vertical stem part to both opposite sides in the diagonal direction, and the fine branch parts of the first sub-pixel electrode and the second sub-pixel electrode are alternately branched to both opposite sides of the horizontal stem part and the vertical stem part.

10. The liquid crystal display of claim 9, wherein:

each of the first sub-pixel electrode and the second sub-pixel electrode of the second pixel electrode includes a vertical stem part, a horizontal stem part intersecting with the vertical stem part, and fine branch parts extended from each horizontal stem part and each vertical stem part to the both opposite sides in the diagonal direction, and each of the first sub-pixel electrode and the second sub-pixel electrode includes an outer side part enclosing an edge thereof.

11. The liquid crystal display of claim 10, wherein:

each of the first sub-pixel electrode and the second sub-pixel electrode of the third pixel electrode includes a vertical stem part, a horizontal stem part intersecting with the vertical stem part, and fine branch parts extended from each horizontal stem part and each vertical stem part to the both opposite sides in the diagonal direction, and each of the first sub-pixel electrode and the second sub-pixel electrode includes an outer side part enclosing an edge thereof.

12. The liquid crystal display of claim 11, wherein:

the fine branch parts of the second pixel electrode and the third pixel electrode are branched to the both opposite sides of the horizontal stem part and the vertical stem part so as to be symmetrical to each other.

13. The liquid crystal display of claim 12, further comprising:

color filters each provided in regions corresponding to the first pixel electrode, the second pixel electrode, and the third pixel electrode, wherein a red color filter is provided in a region corresponding to the first pixel electrode, a green color filter is provided in a region corresponding to the second pixel electrode, and a blue color filter is provided in a region corresponding to the third pixel electrode.

14. The liquid crystal display of claim 1, further comprising:

a second substrate; and a liquid crystal layer interposed between the first substrate and the second substrate.

15. The liquid crystal display of claim 7, wherein:

different voltages are applied to the first sub-pixel electrode and the second sub-pixel electrode, and a voltage supplied to the first sub-pixel electrode is larger than a voltage supplied to the second sub-pixel electrode.

16. The liquid crystal display of claim 7, wherein:

the liquid crystal display includes a portion curved in a horizontal direction.

* * * * *